March 2, 1937. W. R. CUTHBERT ET AL 2,072,245
BOTTLE CAPPING MACHINE
Filed Aug. 14, 1933 4 Sheets-Sheet 1

Inventors:
William R. Cuthbert
and Paul Mundell,
By Jones, Addington, Ames & Siebold Attys.

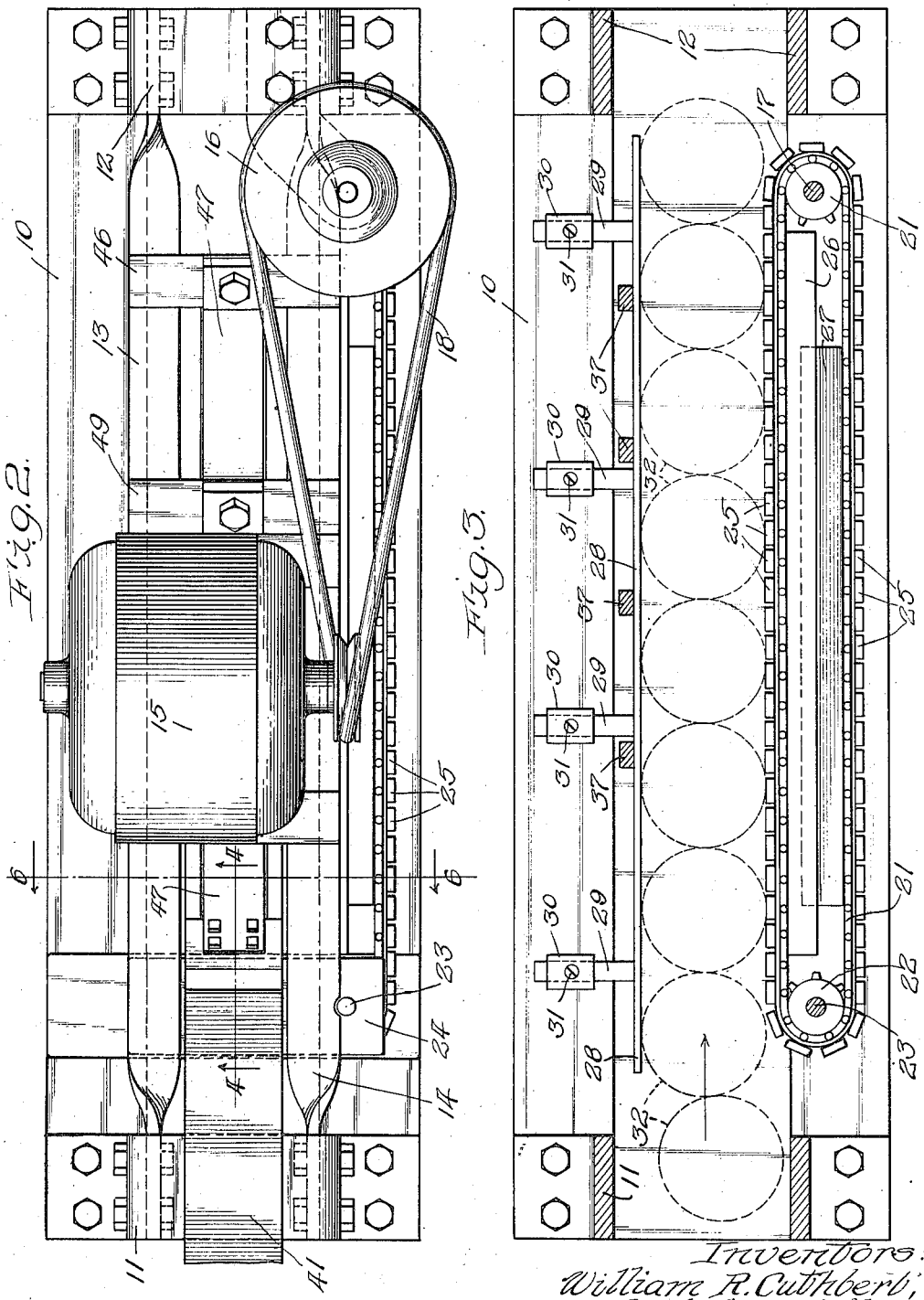

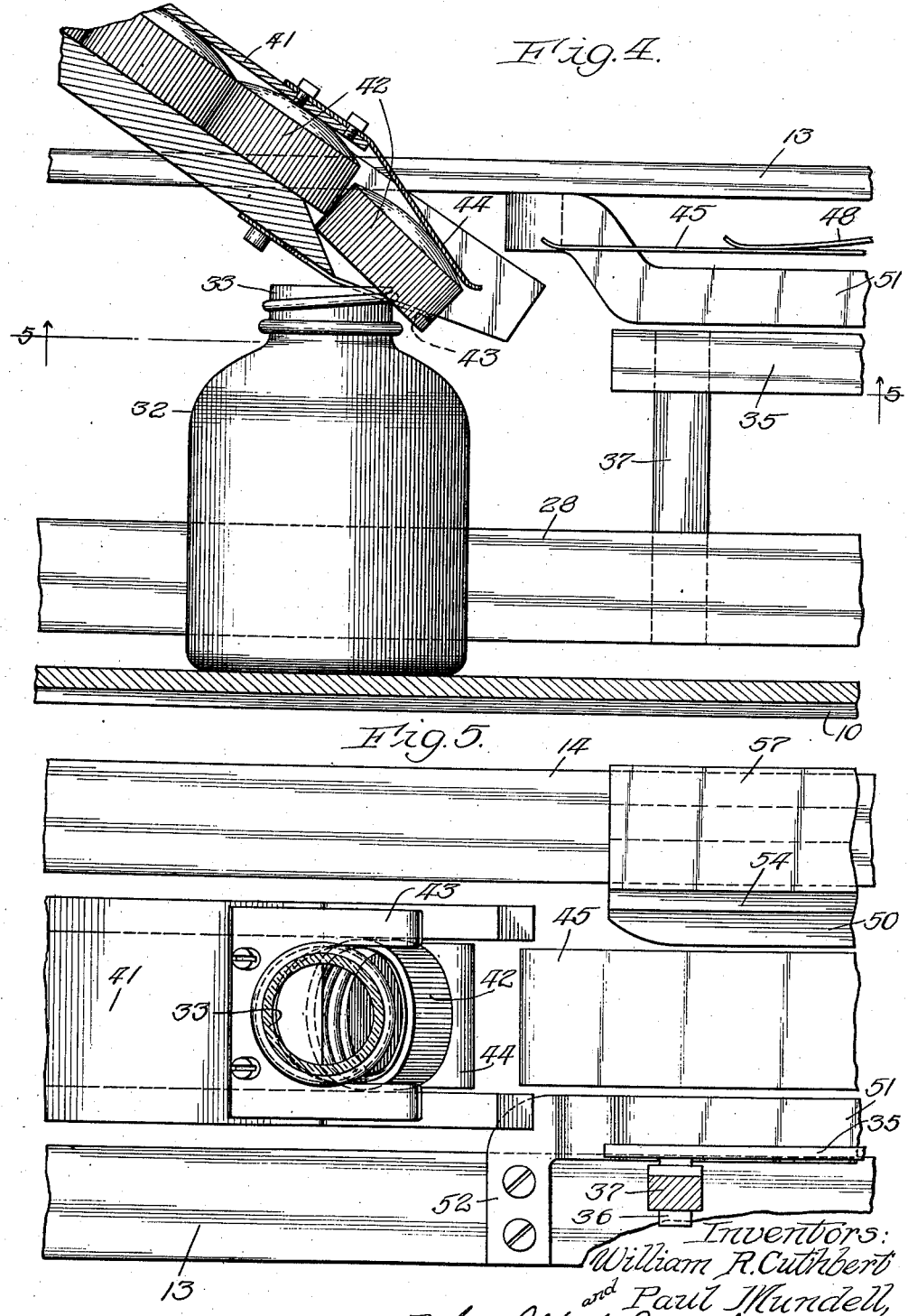

March 2, 1937.  W. R. CUTHBERT ET AL  2,072,245
BOTTLE CAPPING MACHINE
Filed Aug. 14, 1933  4 Sheets-Sheet 4

Inventors:
William R. Cuthbert
and Paul Mundell,
By Jones, Addington,
Ames & Seibold Attys.

Patented Mar. 2, 1937

2,072,245

UNITED STATES PATENT OFFICE 2,072,245

BOTTLE CAPPING MACHINE

William R. Cuthbert and Paul Mundell, Fort Madison, Iowa, assignors to W. A. Sheaffer Pen Company, Fort Madison, Iowa, a corporation of Delaware Application August 14, 1933, Serial No. 685,012

16 Claims. (Cl. 226—88)

This invention relates to a bottle capping machine and has special reference to a device having means for directing a cap on to the neck of a bottle or other container and for tightening the cap thereon.

More particularly, this invention has reference to a device for capping bottles or other containers provided with threads at the openings thereof for engagement with threaded caps, comprising a hopper for holding a plurality of caps with means for retaining successive caps therefrom in the path of movement of bottles which latter have longitudinal movement of a base on which the hopper is mounted, there being resilient means acting on the caps to hold the caps against rotation, although permitting a slidable longitudinal movement thereof with said bottles, and other frictional means for imparting a rotatable as well as longitudinal movement of said bottles along the base in a direction to tighten the caps on the bottles.

Applicants contemplate the provision of an apparatus which is not positive in character, permitting slippage of the caps and bottles, depending upon the relative adjustment therebetween after the cap has been screwed home on the bottle, the particular advantage being that the bottles may be handled at any desired rate of speed and may fluctuate at the rate of speed fed therethrough without any adjustment being made to the machine. This feature is particularly advantageous in the use of the apparatus in connection with other machines, such, for example, as bottle filling machines. The rate of speed of bottle filling machines is not, of course, standard with all machines. Therefore, the present apparatus may accommodate bottles at the rate of thirty a minute or at the rate of ninety a minute without adjustment, the rate of speed being either constant or fluctuated. This also is particularly advantageous in the handling of bottles manually, since no constant speed of operation is maintained.

The device herein contemplated may be motor driven or manually operated, as desired, the drive shaft actuating preferably an endless belt running longitudinally of the machine, which belt has a series of adjacently disposed gripping fingers which may be formed of leather, rubber, or the like, preferably such material as will provide sufficient friction for operating upon the sides of the bottles. The bottles pass between the gripping fingers of the endless chain and an adjustable supporting bar which likewise extends longitudinally and substantially parallel therewith, the bar being spaced so as to provide for the required degree of friction between the gripping fingers and the bottle.

The belt imparts a rotatable and longitudinal movement of the bottles in the path of successive caps fed at an angle adjacent the top or neck of the bottle, the bottle passing beneath and engaging the periphery of the interior of the cap and pulling the cap from its position in resilient gripping fingers in the hopper. The caps are thereafter urged against the neck of the bottle by resilient fingers bearing against the tops of the caps, and the caps are held stationary relative to the rotatable movement of the bottle by frictional means such as a pair of spaced bars, one of which bars is adjustably mounted to obtain a desired degree of friction. After the cap has been screwed home on the bottle, the frictional resistance is overcome during the rest of its travel over the base of the machine whereby the cap rotates with the bottle.

One of the objects of this invention is to provide a bottle capping machine of the character above described in which the operation is not positive, the cap and bottle being given a relative movement by frictional means, which relative movement is arrested when the cap is screwed home on the bottle.

Another object of this invention is to provide a bottle capping machine of the type hereinabove noted which may be employed in connection with other types of apparatus, irrespective of the rate of speed of travel of the bottles therethrough and through the present apparatus.

A still further object of this invention is to provide a bottle capping machine as above pointed out which is comparatively inexpensive in construction, is simple in operation, and is durable.

Other objects and advantages of this invention will be hereinafter more particularly pointed out and for a more complete understanding of the characteristic features of this invention, reference may now be had to the following description when taken together with the accompanying drawings, in which latter:

Fig. 2 is a top plan view of Figure 1;

Fig. 3 is a plan sectional view taken on the line 3—3 of Figure 1;

Fig. 4 is an enlarged fragmentary longitudinal sectional view taken on the line 4—4 of Fig. 2;

Fig. 5 is an underneath plan view taken on the line 5—5 of Fig. 4;

Figure 1:
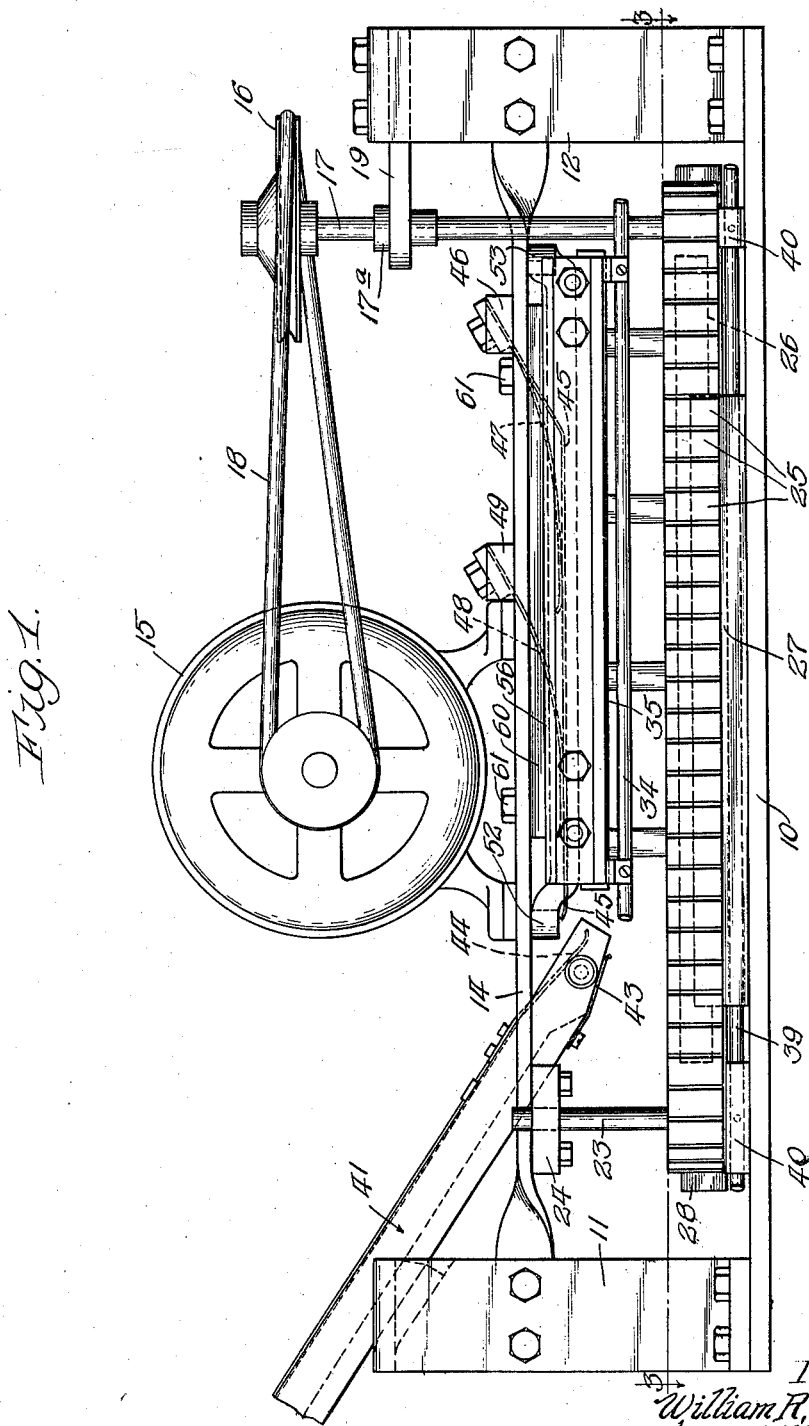
Figure 1 is a side elevational view of a device embodying the features of this invention.
Figure 6:
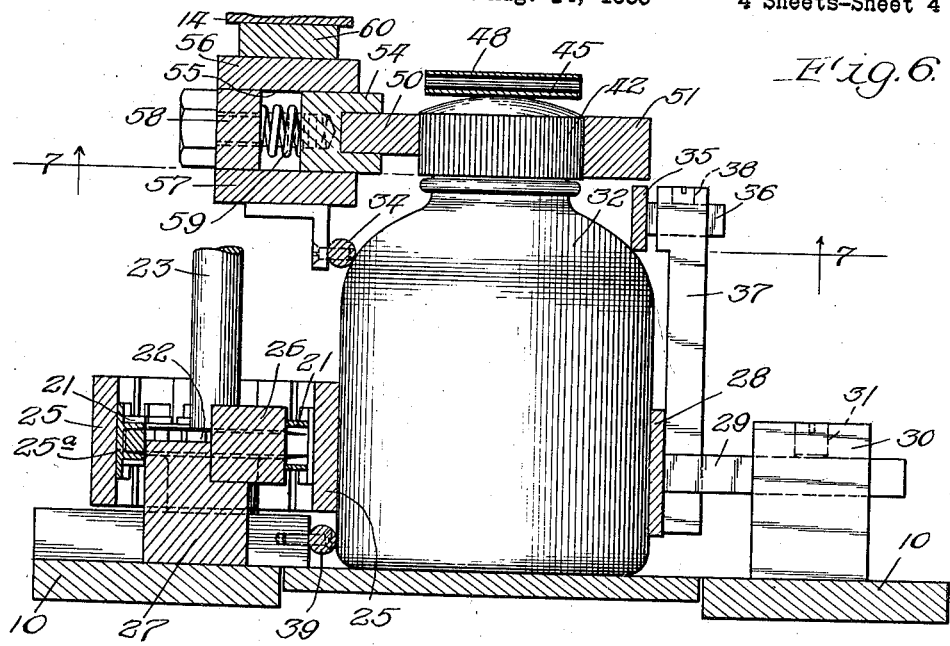
Fig. 6 is an enlarged vertical transverse sectional view taken on the line 6—6 of Fig. 2.
Figure 7:
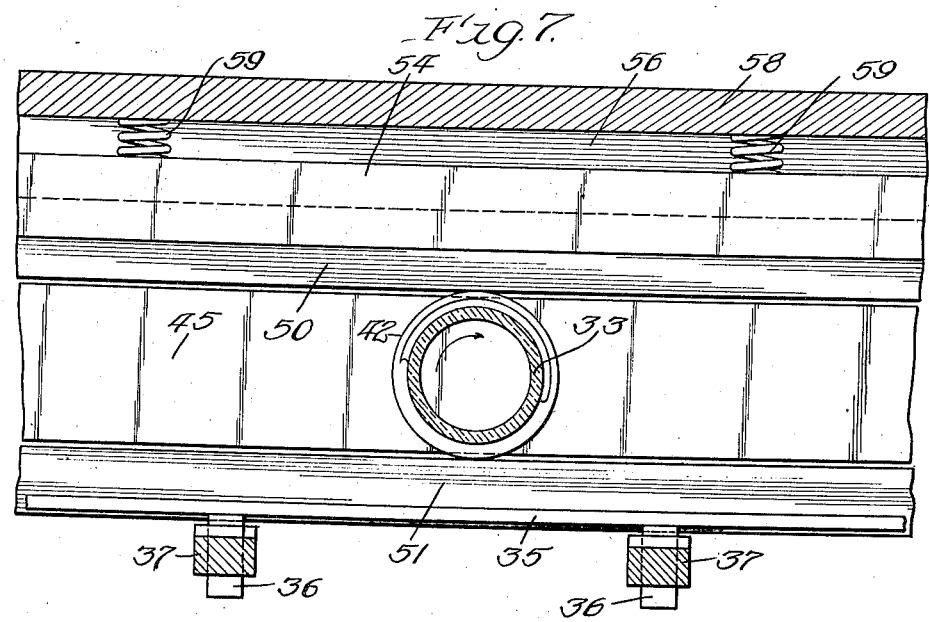
Fig. 7 is an underneath plan view taken on the line 7—7 of Fig. 6.

Referring now more particularly to the drawings, the device of this invention comprises a base 10 having end standards 11 and 12 secured thereto and extending upwardly therefrom. The standards are preferably in the form of inverted U-shaped bands having laterally extending feet through which latter bolts or screws extend into the base 10. A pair of spaced bars 13 and 14 extend longitudinally of the base in a spaced relation therefrom and are secured at the outer ends thereof to the vertically extending sides or arms of the inverted U-shaped standards 11 and 12. In the specific embodiment shown, these bars 13 and 14 are substantially flat and rectangular in cross section, the ends thereof being twisted to present the flat surfaces in a vertical plane for attachment to the supports, the flat faces of the main body portions or intermediate portions thereof being substantially horizontal.

A motor 15 is preferably provided for the operation of this device and is mounted on the cross bars 13 and 14 intermediate the ends thereof. The motor is connected to a pulley 16 of a drive shaft 17 by means of an endless belt 18, the drive shaft 17 being journalled in a bearing 17a suitably mounted on a bracket 19 which latter is supported by the standard 12.

The drive shaft 17 extends perpendicularly of the machine, the lower end thereof being journalled in a suitable bearing on the base 10. A sprocket 20 is fixedly mounted on the lower end of the drive shaft 17 for engaging an endless sprocket chain 21, which latter extends longitudinally of the machine and engages a second sprocket 22 adjacent the other end of the machine. The sprocket 22 is, in turn, fixedly mounted on a stud shaft 23 which extends perpendicularly of the base, one end of the shaft being journalled in a bearing on the base 10 and the other end being journalled in a bearing 24, which latter is suitably mounted as by means of bolts to the bar 14. The sprocket chain 21 is provided preferably with a series of flat gripping fingers 25 forming an endless belt for frictionally engaging the sides of bottles, as will hereinafter be more particularly recited. The fingers 25 are preferably formed of rubber, leather, or a composition material, or such material as may provide a frictional gripping surface, and are mounted on metallic supports 25a secured to the links of the chain 21.

Inasmuch as the chain 21 is flexible, a backing member 26 is provided for retaining the links of the chain together with the gripping fingers fixedly secured thereto in substantial longitudinal alignment, the backing member being preferably in the form of an elongated bar having at least one flat face in front against which the links of the chain rest. This bar 26 is suitably supported on a second bar 27, which latter is mounted on the base 10. The flat face of the bar 26 extending substantially vertically of the plane of the base holds the links of the chain 21 in a position to maintain the front engaging surface of the fingers 25 in a vertical position to uniformly engage over the entire surface thereof, the vertically extending side walls of the bottles. However, if the side walls of the bottles to be capped are at an angle to the vertical, then it is readily apparent that the faces of the gripping fingers 25 may likewise be disposed angularly to the vertical in conformity to the angle of the wall of the bottle by providing the flat face of the bar 26 with such angularity as exists in the walls of the bottles. The engaging surfaces of the fingers 25 thus lie in a single longitudinal plane for uniform engagement with the bottles passing through the machine.

In order to secure a frictional engagement with the bottle, it is desirable to provide an adjustable guide for cooperation with the frictional endless chain, which, in this present showing, may preferably comprise a metallic strap 28 extending longitudinally of the machine and supported on a plurality of cross members 29, which latter slidably engage supports 30 mounted on the base 10. The supports 30 may preferably be provided with set screws 31 extending therethrough for engagement with the cross members 29 to hold the latter in a fixed relation with the supports after adjustment of the former to a desired position. The space between the faces of the fingers 25 and the inner face of the strap 28 is determined, whereafter the set screws 31 when screwed home hold the same in that position.

The bottles 32 in the present instance comprise a main body portion having a reduced threaded neck 33, thereby providing a shoulder at the juncture thereof. The shoulder thus provided is utilized for holding the bottle against displacement in position on the base, a pair of spaced arms 34 and 35 having the lower edges thereof resting on portions of the shoulders. The arm 34 extends longitudinally of the machine and is suitably supported at the ends thereof, the rod bearing against a portion of the shoulder of the bottle 32 to prevent displacement upwardly thereof. A strap 35 extends longitudinally of the machine and bears against the shoulder of the bottle 32 on an opposite side to that of the rod 34, the strap 35 being mounted on pins 36 extending through bearing portions of a plurality of uprights 37. The uprights 37 are, in turn, secured to the lower ends thereof to the strap 28. The strap 35 is preferably adjustable laterally of the machine in order to compensate for varying sizes of bottles, the shaft 36 being slidable in the bearing portion of the upright 37 and being held in any desired adjusted position by means of a set screw 38 mounted in the bearing portion of the upright 37 for engaging the shaft 36. Thus, the provision of the guide members 34 and 35, the guide member 34 being in the form of a wire and the guide member 35 being in the form of a metallic strap, prevents displacement upwardly of the base on which the bottle 32 has longitudinal and rotatable movement. A wire rod 39 extending longitudinally of the machine and journalled in bearings 40 on the base of the machine holds the bottle from jamming into the fingers 25 of the endless belt and permits of a required frictional engagement therebetween. The outer perimeter of the rod 39 is substantially flush with the face of the fingers 25 when in frictional engagement.

A hopper 41 is provided at one end of the machine for feeding caps 42 to a position for engagement with the bottles 32. The caps 42, in this instance, are preferably threaded for engagement with the threads on the neck 33 of the bottle. The hopper is disposed at an inclination to the base of the machine and is secured preferably to the support 11 extending from the base. It is, of course, to be understood that this hopper may be disengaged from the machine and formed of a separate unit, although for convenience of illustration and preference in construction, the hopper has merely been shown as being supported by the most accessible element thereof.

The hopper may be of any usual type, it merely comprising in the present instance an enclosure of a size sufficient to permit the caps to pass therethrough by gravity, the hopper being given an inclination sufficient to permit a free passage and movement therethrough. A resilient forked finger 43 is preferably secured to the lower end of the hopper on the underneath side thereof, the forks of the finger being spaced a distance less than the outside diameter of the caps 42 although sufficiently to permit the neck of the bottle to pass freely therebetween. Another spring finger 44 is preferably secured to the upper side of the lower end of the hopper a spaced distance from the finger 43, both fingers extending beyond the upper and lower sides of the hopper. The fingers 43 and 44 converge and in their normal condition are spaced so as to prevent the release of a cap therefrom except by a force greater than the weight of the cap, the cap resting on the spaced fingers 43 and being held thereagainst by spring finger 44. The positioning of the fingers is such as to hold the cap at an angle in the path of movement of the bottle 32 and at a height from the base sufficient for the neck 33 of the bottle to engage the inner and lower peripheral portions of the cap, as shown more particularly in Fig. 4.

A longitudinal movement of the bottle 32 brings the neck of the bottle into engagement with the cap, whereafter a continued longitudinal movement of the bottle draws the cap from between the spring fingers 43 and 44, the cap dropping in position on the neck of the bottle merely by the weight thereof and is held thereafter in engagement with the top and against displacement therefrom by means of a spring arm 45 which extends a substantial distance longitudinally of the machine, one end of the spring being secured to a cross bar 46 secured to the bars 13 and 14. The free end of the spring extends in a direction toward the hopper and terminates adjacent to the end of the resilient finger 44. The spring 45 is reinforced by springs 47 and 48 bearing thereagainst on the upper surface thereof, the spring 47 being secured to the cross bar 46 and the spring 48 being secured to a second cross bar 49 lying transversely of the machine and being supported by the bars 13 and 14. The cap 42 thus is urged downwardly on the neck of the bottle by means of the spring 45 as supplemented by the action of the springs 47 and 48 to insure a uniform pressure throughout the travel of the cap longitudinally of the machine.

After the cap 42 is placed in engagement with the neck 33 of the bottle 32 and is urged downwardly thereon by means of the aforesaid springs, the cap is then in condition for being screwed home on the bottle 32. The bottle continues its longitudinal and rotatable movement on the base 10, the cap engaging between bars 50 and 51. The bar 51 is disposed just above the strap 35 and extends longitudinally of the machine, the ends thereof being bent upwardly as at 52 and 53 to engage the underneath side of the bar 15 to which the ends are fixedly attached. The depending intermediate portion of the bar 51 is preferably of substantially the same height as the peripheral height of the cap of the bottle, the bar being preferably of metal to frictionally engage the cap and hold the same against movement excepting under substantial tension in its cooperation with the bar 50. The bar 50 extends longitudinally of the machine for engagement with the other side of the cap for cooperation with the bar 51, as above stated, to hold the cap frictionally against rotation excepting under substantial tension. The bar 50 is preferably mounted on a bar 54 which is adjustable laterally of the machine, the bar 54 operating in a slot 55 between spaced arms 56 and 57 secured to an intermediate bar 58. The bar 54 is spring pressed outwardly of its engaging slot 55, the tension of springs 59 being adjustable by means of suitable bolts and nuts, or in any other desired manner. The specific embodiment shown in the drawings comprises a plurality of spaced bolts, the shanks of which are loosely inserted through apertures in the bar 58 and extend to threadedly engage registering apertures in the bar 54, the heads of the bolts limiting the normal spring pressed outward movement of the bar 54 although permitting a compression of the spring and subsequent inward movement of the shanks and bar 54.

The arm 56 is secured to the bar 14 through a spacer 60 by means of bolts 61 and the bar 50 occupies a position at the periphery of the cap. Sufficient spring tension is set to prevent a rotation of the cap 42 between the bars 50 and 51 excepting under substantial tension. Therefore, as the bottle rotates progressively longitudinally of the machine, the cap 42 being held stationary and the threads thereof engaging the threads on the neck of bottle, the cap is tightened on the bottle through this relative movement therebetween. When the cap is threaded home then sufficient resistance is had to cause a slippage between the cap 42 and the cooperating frictional bars 50 and 51 to the end that possibly but a few turns of the bottle in a short distance of travel screws the cap home. This slippage between the cap and the cooperating bars 50 and 51 continues until the bottle passes out of the machine.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

We claim:

1. In a device for capping bottles or other containers provided with threads at the openings thereof for engagement with threaded caps, means for positioning said caps on said bottles for threaded engagement, frictional means for holding said caps against rotation, and frictional means for rotating said bottles to provide relative movement of said caps and bottles when engaged in a direction to tighten said caps.

2. In a device for capping bottles or other containers provided with threads at the openings thereof for engagement with threaded caps, frictional means for holding said caps against rotation and permitting a longitudinal movement thereof when engaged by said bottles, and an endless belt for imparting rotatable and longitudinal movement to said bottles, said rotatable movement being in a direction to tighten said caps on said bottles.

3. In a device for capping bottles or other containers provided with threads at the openings thereof for engagement with threaded caps, frictional means for holding said caps against rotation and permitting a longitudinal movement thereof when engaged by said bottles, a base for supporting a plurality of said bottles, and frictional means for engagement with the sides of said bottles for imparting rotatable and longitudinal movement to said bottles, said rotatable movement being in a direction to tighten said caps on said bottles.

4. In a device for capping bottles or other containers provided with threads at the openings thereof for engagement with threaded caps, frictional means for holding said caps against rotation and permitting a longitudinal movement thereof, a base for supporting a plurality of said bottles, and an endless belt having means for imparting rotatable and longitudinal movement to said bottles relative to said device, said rotatable movement being in a direction to tighten said caps on said bottles.

5. In a device for capping bottles or other containers provided with threads at the openings thereof for engagement with threaded caps, frictional means for holding said caps against rotation and permitting a longitudinal movement thereof, a base for supporting a plurality of said bottles, a longitudinally extending endless belt mounted on spaced pulleys on one side of said base, said belt having frictional means thereon, means for rotating one of said pulleys to operate said belt, and adjustable means on the other side of said base, said bottles being frictionally engaged between the frictional means of said belt and said adjustable means to have rotatable and longitudinal movement over said base, said rotatable movement being in a direction to tighten said caps on said bottles.

6. In a device for capping bottles or other containers provided with threads at the openings thereof for engagement with threaded caps, frictional means for holding said caps against rotation and permitting a longitudinal movement thereof, a base for supporting a plurality of said bottles, a longitudinally extending endless belt mounted on spaced pulleys on one side of said base, means for rotating one of said pulleys to operate said belt, and a bar adjustable laterally of said device on the other side of said base and extending longitudinally thereof, means on said belt for frictionally engaging said bottles on one side thereof for imparting a rotatable and longitudinal movement thereto, said bar urging said bottles in position against said belt and permitting a slidable engagement of said bottles on said bar, said rotatable movement being in a direction to tighten said caps on said bottles.

7. In a device for capping bottles or other containers provided with threads at the openings thereof for engagement with threaded caps, frictional means for holding said caps against rotation and permitting a longitudinal movement thereof, a base for supporting a plurality of said bottles, a longitudinally extending endless belt mounted on spaced pulleys on one side of said base, means for rotating one of said pulleys to operate said belt, a bar adjustable laterally of said device on the other side of said base and extending longitudinally thereof, means on said belt for frictionally engaging said bottles on one side thereof for imparting a rotatable and longitudinal movement thereto, said bar urging said bottles in position against said belt and permitting a slidable engagement of said bottles on said bar, and means for slidably engaging said bottles to hold the same against displacement from said base, said rotatable movement being in a direction to tighten said caps on said bottles.

8. In a device for capping bottles or other containers provided with threads at the openings thereof for engagement with threaded caps, frictional means for imparting rotatable and longitudinal movement to said bottles relative to said device, and adjustable frictional means acting on the sides of said caps to hold said caps against rotation and permitting a slidable longitudinal movement thereof when engaged by said bottles, the rotatable movement of said bottles being in a direction to tighten said caps thereon.

9. In a device for capping bottles or other containers provided with threads at the openings thereof for engagement with threaded caps, frictional means for imparting rotatable and longitudinal movement to said bottles relative to said device, resilient means acting on the top of said caps for urging an engaged relation thereof with said bottles, and frictional means acting on the sides of said caps to hold said caps against rotation and permitting a slidable longitudinal movement thereof when engaged by said bottles, the rotatable movement of said bottles being in a direction to tighten said caps thereon.

10. In a device for capping bottles or other containers provided with threads at the openings thereof for engagement with threaded caps, frictional means for imparting rotatable and longitudinal movement to said bottles relative to said device, resilient means acting on the top of said caps for urging an engaged relation thereof with said bottles, and an adjustable bar extending longitudinally of said device for frictionally engaging the sides of said caps to hold said caps against rotation and permitting a slidable longitudinal movement thereof when engaged by said bottles, the rotatable movement of said bottles being in a direction to tighten said caps thereon.

11. In a device for capping bottles or other containers provided with threads at the openings thereof for engagement with threaded caps, frictional means for imparting rotatable and longitudinal movement to said bottles relative to said device, resilient means acting on the top of said caps for urging an engaged relation thereof with said bottles, and a pair of spaced bars extending longitudinally of said device, said caps being frictionally engaged between said bars to permit a slidable longitudinal movement thereof but to hold said caps against rotation, one of said bars being adjustable to determine said frictional engagement, said rotatable movement of said bottles being in a direction to tighten said caps thereon.

12. In a device for capping bottles or other containers provided with threads at the openings thereof for engagement with threaded caps, a base for supporting a plurality of bottles, a hopper for holding a plurality of caps, frictional means for imparting rotatable and longitudinal movement of said bottles along said base, means for retaining successive caps from said hopper in the path of movement of said bottles at the threaded openings thereof, each of said bottles removing one of said caps from said retaining device in the longitudinal movement thereof in position to be threadedly engaged, and frictional means acting on the sides of said caps to hold said caps against rotation and permitting a slidable longitudinal movement thereof with said bottles, the rotatable movement of said bottles being in a direction to tighten said caps thereon.

13. In a device for capping bottles or other containers provided with threads at the openings thereof for engagement with threaded caps, a base for supporting a plurality of bottles, a hopper for holding a plurality of caps, frictional means for imparting rotatable and longitudinal movement of said bottles along said base, means for retaining successive caps from said hopper in the path of movement of said bottles at the threaded openings thereof, each of said bottles removing one of said caps from said retaining device in the longitudinal movement thereof in position to be threadedly engaged, resilient means acting on the tops of said caps for urging the same against said threaded openings, and frictional means acting on the sides of said caps to hold said caps against rotation and permitting a slidable longitudinal movement thereof with said bottles, the rotatable movement of said bottles being in a direction to tighten said caps thereon.

14. In a device for capping bottles or other containers provided with threads at the openings thereof for engagement with threaded caps, a base for supporting a plurality of bottles, a hopper for holding a plurality of caps, frictional means for imparting rotatable and longitudinal movement of said bottles along said base, resilient fingers at the end of said hopper for holding successive caps therefrom at an angle to said bottles and in the path of movement thereof at the threaded openings, each of said bottles removing one of said caps against the tension of said resilient fingers in the longitudinal movement thereof in position to be threadedly engaged, resilient means acting on the tops of said caps for urging the same against said threaded openings, and frictional means acting on the sides of said caps to hold said caps against rotation and permitting a slidable longitudinal movement thereof with said bottles, the rotatable movement of said bottles being in a direction to tighten said caps thereon.

15. In a device for capping bottles or other containers provided with threads at the openings thereof for engagement with threaded caps, a base for supporting a plurality of bottles, a hopper for holding a plurality of caps, frictional means for imparting rotatable and longitudinal movement of said bottles along said base, spaced fingers at the end of said hopper on which said caps may rest, a resilient finger above said spaced fingers cooperating therewith to retain successive caps from said hopper at an angle to said bottles and in the path of movement thereof, the threaded opening of said bottles passing between said spaced fingers and engaging the caps to remove the same from said cooperating fingers in position to be threadedly engaged, resilient means acting on the tops of said caps for urging the same against said threaded openings, and frictional means acting on the sides of said caps to hold said caps against rotation and permitting a slidable longitudinal movement thereof with said bottles, the rotatable movement of said bottles being in a direction to tighten said caps thereon.

16. In a device for capping bottles or other containers provided with connecting means at the openings thereof for engagement with caps having cooperating connecting means, means for depositing said caps on said bottles in position for connection, means for holding said caps against rotation, and means for rotating said bottles to provide relative movement of said caps and bottles in opposite directions to tighten said caps on said bottles.

WILLIAM R. CUTHBERT.
PAUL MUNDELL.